Nov. 24, 1953 B. M. OLIVER 2,660,614

TELEVISION CORRECTING CIRCUIT

Filed Jan. 21, 1949

3 Sheets-Sheet 1

INVENTOR
B. M. OLIVER
BY Hugh S. Wertz
ATTORNEY

Nov. 24, 1953

B. M. OLIVER 2,660,614

TELEVISION CORRECTING CIRCUIT

Filed Jan. 21, 1949

3 Sheets-Sheet 2

INVENTOR
B. M. OLIVER
BY
ATTORNEY

INVENTOR
B. M. OLIVER
BY Hugh S. Wertz
ATTORNEY

Patented Nov. 24, 1953

2,660,614

UNITED STATES PATENT OFFICE 2,660,614

TELEVISION CORRECTING CIRCUIT

Bernard M. Oliver, Morristown, N. J., assignor to Bell Telephone Laboratories, Incorporated, New York, N. Y., a corporation of New York Application January 21, 1949, Serial No. 72,045

5 Claims. (Cl. 178—7.2)

This invention relates to correcting circuits and more specifically to electric circuits for correcting certain distortions in television systems.

It is an object of this invention to improve the picture quality of a television system.

It is another object of this invention to improve this picture quality without making any changes in the circuits of the television receiver.

It is a further object of this invention to correct television signals so that the reproduced brightness of the various elemental areas of the picture on the screen of the television receiver tube is at all times proportional to the original brightness of the corresponding elemental areas of the subject at the transmitting station.

Many television camera tubes, such as, for example, the Farnsworth Dissector and the Image Orthicon are so-called linear devices, that is, the signal output thereof is at all times proportional to the light intensity of the elemental area of the subject being scanned. In constrast to this, in most television receiver viewing tubes, the relation between screen brightness and grid signal voltage is non-linear. Over the useful range of screen brightnesses, the characteristic of a television viewing tube may be represented by a power law. In other words $$B_2=K_2(e_g-E_B)^n=K_2E^n \qquad (1)$$

where $B_2$ equals screen brightness, $K_2$ is a constant, $e_g$ is the grid-cathode voltage, $E_B$ is a reference bias voltage and E is equal to $(e_g-E_B)$ which is the signal voltage, that is the grid volts above a reference value.

If a viewing tube described by Equation 1 above is connected by a linear system to a linear camera tube so that $$E=K_1B_1 \qquad (2)$$

where $K_1$ is equal to a constant and $B_1$ is the subject brightness, then $$B_2=K_1^nK_2B_1^n \qquad (3)$$

The practical effect of this is to increase the contrast of the reproduction compared to the original. A quantitative relation between the percentage change in brightness of the reproduction and original can be found by differentiating Equation 3 and dividing the result by Equation 3 whence:

$$\frac{dB_2}{B_2}=n\frac{dB_1}{B_1} \qquad (4)$$

Now if $n$ were equal to 2.7 (which is a practical case), then obviously a one per cent change in $B_1$ would produce a 2.7 per cent change in $B_2$. That is, the contrast in the reproduction is 2.7 times as great as in the original. Continuing with this illustration, if the usable brightness range of the viewing tube is, for example, 100 to 1, then the range of subject brightness which can be handled by the system is only $$(100)^{1/2.7}=5.4 \text{ to } 1$$

Obviously, present-day television systems which employ a linear camera tube and a "power law" viewing tube yield reproduced images in which the brightness range is greatly enhanced compared to that in the original scene. This severely limits the range of brightness of an original scene which can be handled by the system.

Linear reproduction in which the reproduced brightness is at all times proportional to the original subject brightness can be achieved with a linear pick-up device and a linear viewing tube, or with a "logarithmic" pick-up device and an "exponential" viewing tube, or an $n$th root pick-up device and an $n$th power viewing tube, or in fact with any pick-up device and viewing tube having single-valued characteristics inversely related to each other. When this is not the case the connecting transmission system must be made non-linear in order to linearize the complete system.

In accordance with the present invention, there is provided a device which makes linear a system employing a linear pick-up tube and a power law viewing tube. This results in an output at the transmitter which is proportional to the $n$th root of the subject brightness with respect to black level, where $n$ is the exponent of the viewing tube characteristic. The employment of this invention results in a transmitter which has a single-valued characteristic which is the inverse of that of the receiver, thus yielding an over-all system in which the scene brightness is linearly reproduced. This invention has come to be known as the "rooter," since the resulting transmitter characteristic is approximately an $n$th root law.

Specifically, the "rooter" device takes the nth root of the instantaneous signal amplitude in a video signal produced by a linear electron camera, such as a dissector or image Orthicon, where $n$ is made equal to the exponent of the power law approximation to the cathode-ray receiver tube characteristic used in the system. The "rooter" output is utilized as the picture signal which is delivered to the radio transmitter or transmission line, after the proper addition of blanking and synchronizing pulses.

The invention will be more readily understood by referring to the following description taken in connection with the accompanying drawing forming a part thereof in which.

Figure 1:
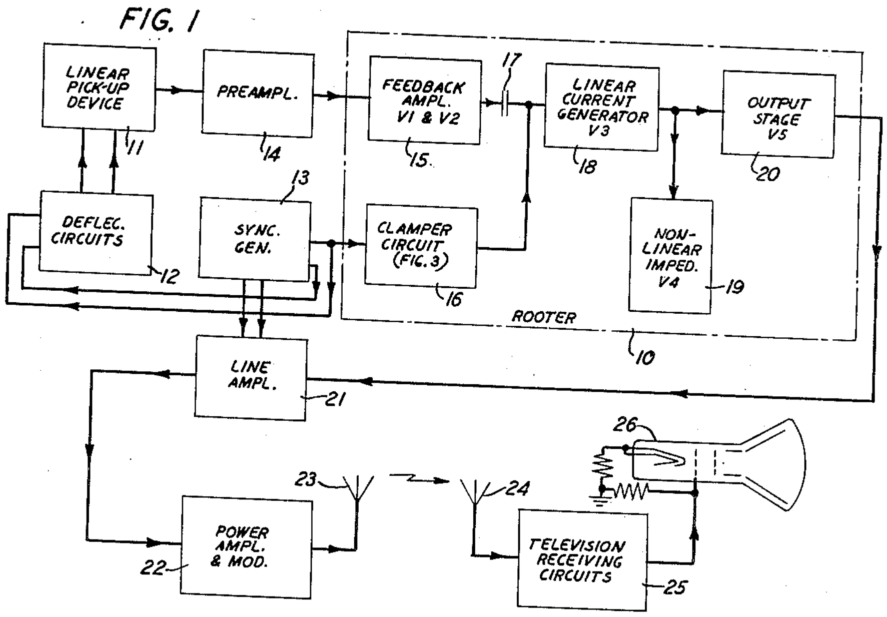
Fig. 1 is a block schematic diagram of a complete television system in which the correcting circuit (called the "rooter") is shown in somewhat greater detail than the rest of the system.

Referring more specifically to the drawings, Fig. 1 shows, by way of example for purposes of illustrating the invention, a complete television system embodying a correcting circuit in accordance with the invention. The correcting circuit is represented by the elements within the dash-dot rectangle 10. The scene to be televised is viewed by the linear pick-up tube 11 which is of any suitable form. It may be an image Orthicon or Iconoscope, for example. To the device 11 is applied in a well-known manner horizontal and vertical deflecting waves produced by suitable deflecting circuits represented by a box 12. These deflecting waves are synchronized by horizontal and vertical drive pulses delivered to the input of the respective deflection circuits from the synchronizing pulse generator 13. The video signal from the linear pick-up device 11 is amplified by a preamplifier 14 of any suitable form whose output is then applied to the "rooter" circuit 10. Specifically, this amplified signal is applied to a negative feedback amplifier 15 forming a portion of the circuit 10. Horizontal driving pulses from the synchronizing pulse generator 13 are also applied to the clamper circuit 16 forming a portion of the correcting circuit 10. Clamper circuits are well known in the art and one will be described in greater detail below in connection with the circuit of Fig. 3. It is sufficient to say at this point that the clamper circuit, for a fixed interval in each line scan, causes the grid of the tube V3 in the linear current generator 18 (see Fig. 2) forming a portion of the correcting circuit 10 to be grounded during this fixed interval. This period is made to occur when the linear pick-up device 11 is scanning a black strip at the left-hand edge of each scanning line (or during any interval when the signal from the pick-up device is at level corresponding to a known constant brightness). Consequently, ground on the grid of the linear current generator 18 is made to correspond to black in the picture. The output current of the linear current generator 18 is proportional to the voltage, above ground, applied to its grid and hence to the brightness of the picture element being scanned. This current flows through a non-linear impedance 19 which has a single-valued characteristic which is the inverse of that of the viewing tube 26 at the receiver station. The voltage obtained across the non-linear impedance 19 is amplified by the output stage 20 to the same level as the voltage input to the feedback amplifier 15. The signal is then applied to the line amplifier 21 where it is amplified and mixed with vertical and horizontal blanking and synchronizing pulses from the synchronizing generator 13. From the line amplifier 21 the composite signal produced therein is applied to the power amplifier and modulator 22 where it is amplified to the required power, modulated by the assigned carrier frequency and applied to the transmitting antenna 23. The receiving antenna 24 intercepts a part of the signal radiated from antenna 23 and applies it to a television receiver circuit 25 of any suitable form where it is detected and amplified and finally applied as a picture signal to the grid of the viewing tube 26 of any suitable type. The tube 26, if it is one of those generally used, has a relation between screen brightness and grid signal voltage which is non-linear, but in accordance with this invention, and due essentially to the inverse nature of the characteristics of the non-linear impedance 19 which corrects for the non-linear characteristic of the viewing tube 26, the over-all system is linear.

Figure 2:
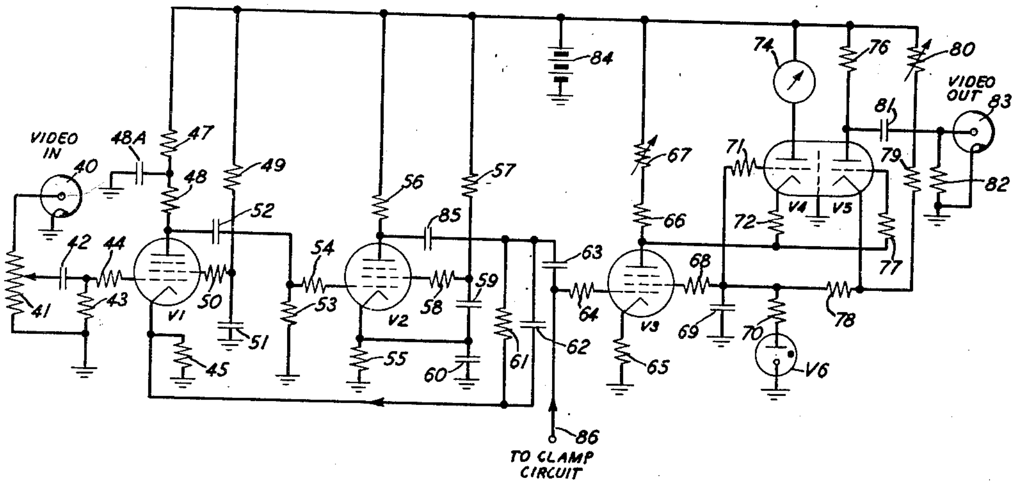
Fig. 2 is a schematic circuit diagram of a portion of the correcting circuit of this invention.

The operation of the correcting or "rooter" circuit 10 will now be described in greater detail, reference being made to Figs. 2 and 3. Referring first to Fig. 2, the tubes V1 and V2, with their associated circuit elements, constitute a negative feedback amplifier. The video signal on which the rooting operation is to be performed is applied from the preamplifier 14 across potentiometer 41 which terminates the video input cable 40 and also serves as a manual gain control. The applied signal is of the standard polarity, that is, "black negative." The signal across the selected portion of potentiometer 41 is applied through the coupling condenser 42 and the "anti-sing" resistor 44 to the control grid of the tube V1, a leak resistor 43 being also connected in the input circuit of this tube. The cathode has a self-bias resistor 45 while the anode is connected through the resistors 48 and 47 to the positive terminal of a source of B-potential 84. An appropriate filter condenser 48A is connected between the common terminal of resistors 47 and 48 to ground. The screen grid of the tube V1 is connected by means of resistors 49 and 50 to the positive terminal of source 84 and by means of the "anti-sing" resistor 50 and condenser 51 to ground. The output of the tube V1 is applied by means of the coupling condenser 52 and the "anti-sing" resistor 54 to the control grid of the tube V2, a grid leak resistor 53 being also connected in the input circuit of this tube. The cathode has a resistor 55 connected thereto which is shunted by a high frequency by-pass and equalizing condenser 60. The anode is connected by means of the resistor 56 to the positive terminal of the source 84 while the screen grid is connected through "anti-sing" resistor 58 and resistor 57 to this positive terminal, the common terminal of resistors 57 and 58 being connected through condensers 59 and 60 to ground. The output of the tube V2 is applied through coupling condensers 85 and 63 and "anti-sing" resistor 64 to the control grid of the tube V3. The common terminal of the condensers 85 and 63 is connected through the parallel-connected condenser 62 and resistor 61 to the cathode of the tube V1 thus providing a negative feedback path.

The output of the clamper circuit (shown in Fig. 3) is applied by means of the connection 86 to the common terminal of the members 63 and 64 and thence to the control grid of the tube V3. The cathode of the tube V3 is connected through the unbypassed cathode resistor 65 to ground while the anode is connected through the resistors 66 and 67, the latter being adjustable, to the positive terminal of the source 84. The screen grid is connected through the "anti-sing" resistor 68 and resistor 70 to the anode of the voltage regulator tube V6, the cathode of which is grounded. The common terminal of resistors 68 and 70 is by-passed to ground by condenser 69. This common terminal is also connected through the resistor 71 to the control grid of the tube V4 and through the resistor 78 to the cathode of tube V5. Part of the current required for the operation of tube V6 is drawn from the positive B-supply 84 through the resistors 80 and 79. The tube V3 is a linear current generator since its internal impedance is very high compared to its load (the resistors 66 and 67 in series, shunted by the tube V4 and the resistor 72 in series), and because there is a large amount of local current feedback produced by the resistor 65. At the beginning of each line scan when the linear pick-up tube 11 is scanning a black strip, the clamper circuit 16 shown in Fig. 3 causes the terminal 86 to be grounded. Thus black is made to correspond to ground at the grid of the tube V3. This action effectively reinserts the direct current and low frequency content of the picture signal, and in order that this content not be lost before the signal is applied to the non-linear impedance in the plate circuit of V3, tube V3 must have flat transmission down to zero frequency. For this reason, the voltage regulator tube V6 is used (instead of the usual resistor and by-pass condenser combination) to furnish voltage for the screen of the tube V3.

The grid of the tube V4 is connected to the screen supply of the tube V3, this supply becoming effectively the "ground" or reference end of the non-linear impedance which is composed of the tube V4 in series with the resistor 72, and the parallel path consisting of the high resistors 66 and 67 in series. Variations in the screen supply voltage are minimized with respect to the output tube V5 since the cathode of the output stage is connected through the biasing resistor 78 to the same screen supply voltage. If the reference voltage across V6 and resistor 70 in series is changed by a positive increment then the cathode of V5 is driven positive. However, the grid of the tube V5 is also driven positive due to the cathode follower action of the tube V1. Consequently, the grid-cathode voltage of the tube V5 is left substantially unchanged. Anode voltage for the tube V5 is provided through resistance 76 and grid bias is attained by the current through V5 and the current through resistors 79 and 80 flowing through resistor 78. Resistor 78 is left unbypassed, thus securing the benefits of negative feedback with respect to linearity and reduction of input capacity for V5. The plate of tube V3 and the grid of the tube V5 are direct-coupled through the resistor 77, thus also reducing the stray capacity by the elimination of an otherwise necessary, bulky condenser. Under black picture conditions, the current in the tube V5 is adjusted to a desired value by a variable resistor 80. A portion of this current can be read on the meter 74 by connecting it in the plate circuit thereof by appropriate switching means (not shown). The essential non-linear characteristic of the load of V3 is provided by the tube V4. The anode of the tube V5 is connected through coupling condenser 81 and leak resistor 82 to the video output terminal 83.

In one typical embodiment constructed in accordance with the invention, the circuit elements have the following values:

| | |
|---|---|
| Resistance 41 | 75 ohms |
| Capacitance 42 | .5 microfarad |
| Resistance 43 | .1 megohm |
| Resistance 44 | 22 ohms |
| Resistance 45 | 91 ohms |
| Resistance 46 | 5600 ohms |
| Resistance 47 | 5600 ohms |
| Capacitance 48 | 20 microfarads |
| Resistance 49 | 30,000 ohms |
| Resistance 50 | 39 ohms |
| Capacitance 51 | 10 microfarads |
| Capacitance 52 | .03 microfarad |
| Resistance 53 | .1 megohm |
| Resistance 54 | 22 ohms |
| Resistance 55 | 91 ohms |
| Resistance 56 | 10,200 ohms |
| Resistance 57 | 30,000 ohms |
| Resistance 58 | 39 ohms |
| Capacitance 59 | 30 microfarads |
| Capacitance 60 | 500 micromicrofarads |
| Resistance 61 | 2000 ohms |
| Capacitance 62 | 4 micromicrofarads |
| Capacitance 63 | 2000 micromicrofarads |
| Resistance 64 | 47 ohms |
| Resistance 65 | 510 ohms |
| Resistance 66 | 24,000 ohms |
| Resistance 67 | 25,000 ohms |
| Resistance 68 | 39 ohms |
| Capacitance 69 | 40 microfarads |
| Resistance 70 | 22 ohms |
| Resistance 71 | 47 ohms |
| Resistance 72 | 100 ohms |
| Resistance 76 | 2200 ohms |
| Resistance 77 | 47 ohms |
| Resistance 78 | 560 ohms |
| Resistance 79 | 24,000 ohms |
| Resistance 80 | 25,000 ohms |
| Capacitance 81 | 16 microfarads |
| Resistance 82 | 10,000 ohms |
| Capacitance 85 | 4 microfarads |
| Capacitance 101 | 1000 micromicrofarads |
| Resistance 102 | .56 megohm |
| Resistance 103 | 100 ohms |
| Resistance 104 | 6200 ohms |
| Resistance 105 | 12,000 ohms |
| Resistance 106 | .27 megohm |
| Resistance 107 | 12,000 ohms |
| Resistance 108 | 39,000 ohms |
| Resistance 109 | .1 megohm |
| Resistance 110 | 100 ohms |
| Capacitance 111 | 50 micromicrofarads |
| Capacitance 112 | 50 micromicrofarads |
| Resistance 113 | .51 megohm |
| Resistance 114 | 100 ohms |
| Resistance 115 | 5100 ohms |
| Resistance 116 | 33,000 ohms |
| Capacitance 117 | .02 microfarad |
| Resistance 118 | 2000 ohms |
| Capacitance 119 | 1000 micromicrofarads |
| Resistance 120 | .1 megohm |
| Resistance 121 | 100 ohms |
| Resistance 122 | 2000 ohms |

| | |
|---|---|
| Capacitance 123 | .05 microfarad |
| Resistance 124 | .1 megohm |
| Capacitance 125 | .05 microfarad |
| Resistance 126 | .1 megohm |

and the following tubes are used:

| | |
|---|---|
| V1—404A | V7—2C51 |
| V2—404A | V8—2C51 |
| V3—404A | V9—2C51 |
| V4—2C51 | V10—2C51 |
| V5—2C51 | V11—6AL5 |
| V6—VR150 | V12—6AL5 |

Figure 4:
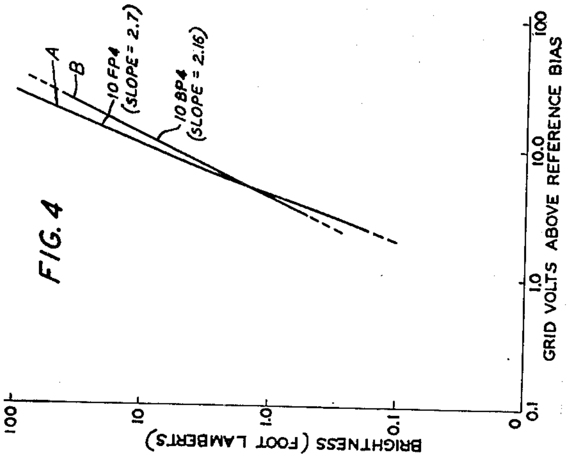
Fig. 4 is a logarithmic plot of the brightness characteristics of two typical receiver viewing tubes, the brightness being plotted against grid voltage above a reference bias voltage.

Fig. 4 shows the brightness output versus grid volts characteristic above a reference bias for two well-known types of television viewing tubes. Curve A shows the brightness versus grid volts plotted to logarithmic scales for the tube 10FP4. This line is linear and has a slope of about 2.7, while curve B is a similar plot for the 10BP4 tube and has a slope equal to about 2.16.

Figure 6:
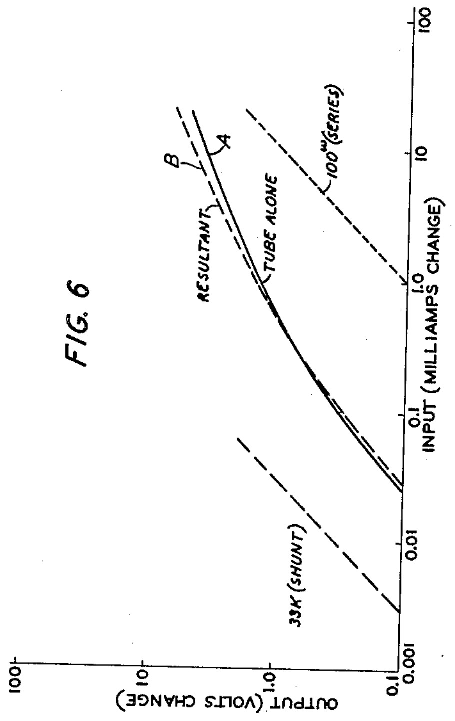
Fig. 6 is a logarithmic plot of output versus input characteristics taken at various portions of the correcting circuit.
Figure 7:
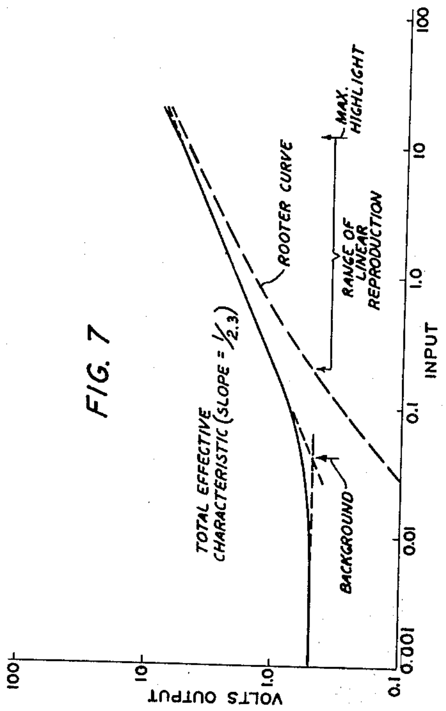
Fig. 7 is a logarithmic plot of the output versus input characteristic of a correcting circuit which was actually used.
Figure 5:
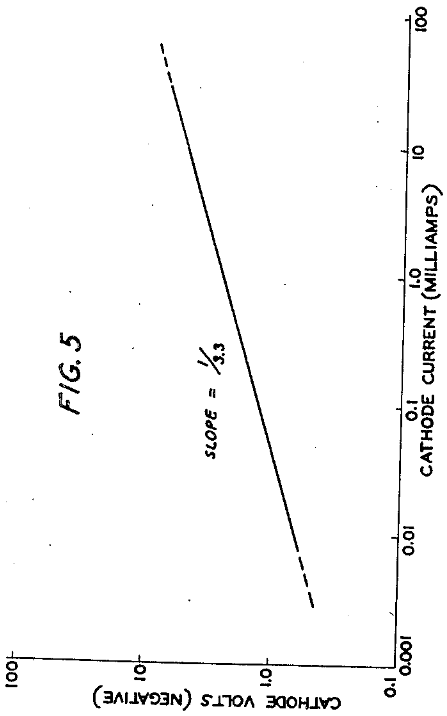
Fig. 5 is a logarithmic plot of cathode voltage versus cathode current for a representative triode tube.

Fig. 5 is a plot of cathode volts versus cathode current on logarithmic scales for a triode of the 2C51/396A type (the tube V4). This slope is indicated on the drawing as 1/3.3 which is of the order of the inverse slope of the viewing tubes. However, this is not exactly the slope which V4 has in the actual circuit due to the necessary shunting and series resistors. The variable resistor 67 is used to set the current through the tube V4 at a desired value for a black picture. There are several reasons for not having zero current in V4 correspond to a black picture. If a black picture were made to correspond to zero current in the tube V4, then, due to aging or in warm-up periods, it would be quite possible for the tube V4 to be completely cut off. The cathode of the tube V4 would present an infinite impedance and the load impedance of the linear current generator V3 would consist only of the branch comprising resistor 66 and a portion of resistor 67. This would result in highly distorted wave forms being applied to the output tube V5 during the darkest portions of the picture. Moreover, the impedance of the cathode circuit of the tube V4 would be too high to preserve the required band width of the system if the current in V4 were less than some desired value which, by way of example, can be approximately 100 microemperes for the 2C51/396A triode. The effect of the linear resistor 72 in series with the cathode of V4 and the shunting resistors 66 and 67 is to make the over-all characteristic more linear than that of V4 (the "rooter" tube) alone. The new characteristic is obviously the change in plate voltage of V3 versus the change in plate current from the black current (100 microamperes) point. This characteristic can be obtained from that of Fig. 5 by shifting the axes so that zero voltage and current correspond to the black signal conditions. The result is the solid curve A in Fig. 6 marked "tube alone." Now the tube V4 is in series with the resistor 72 (of the order of 100 ohms) and in parallel with an impedance of the order of 33,000 ohms under proper operating conditions. These linear resistance values are also plotted on Fig. 6. The final resultant characteristic (shown as the dash line B) can be obtained by adding the ordinates of the tube characteristic to that of the 100 ohms (adding voltage drops produced by the same current) and then adding the abscissae of the curve obtained to that of the 33,000-ohm resistor (adding currents produced by the same voltage). The resultant characteristic B of Fig. 6 does not apparently resemble the required characteristic which is the inverse of those on Fig. 4. However, an arbitrary constant voltage can be added to the output voltage of the rooter tube V4. This corresponds to changing the bias on the viewing tube 26, or to changing the "set-up" in the line amplifier 21. When the resultant characteristic of Fig. 6 is shifted up by a desired voltage the result is the solid-line characteristic of Fig. 7. While the abscissae of Fig. 7 are the same as those of Fig. 6, that is milliamperes change from black picture current, the abscissae may also be interpreted as proportional to the subject brightness since the system is presumed to be linear up to this point. It will be noted that the characteristic of Fig. 7 has a practically constant slope of 1/2.3 over a subject brightness range of approximately 60 to 1. The slope of this characteristic is practically equal to the inverse of the average of those shown on Fig. 4. If a 2.3 power law viewing tube is used, the reproduction will be linear over the range indicated in Fig. 7.

Figure 3:
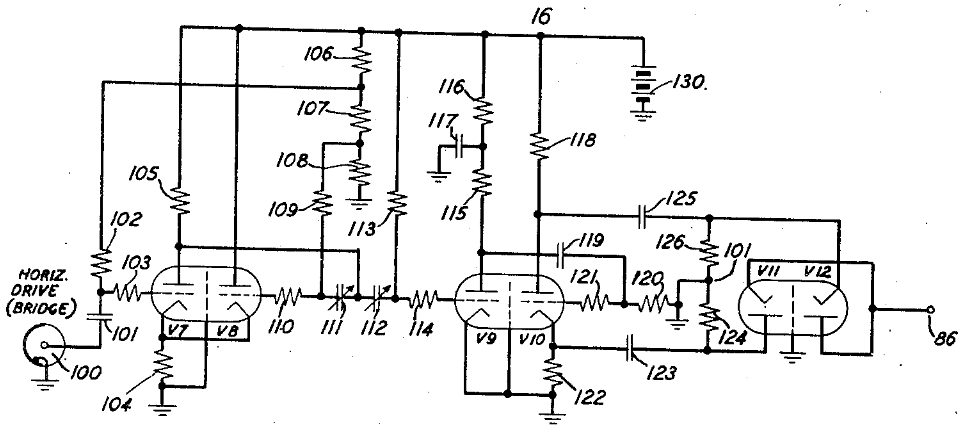
Fig. 3 is a schematic circuit diagram of another portion of the correcting circuit of the invention.

Reference will now be made to Fig. 3 which shows a suitable clamper circuit which can be applied to the connection 86 in Fig. 2 in order to ground this terminal while the linear pick-up device 11 is scanning a black strip at the left of the scanning lines. In the arrangement of Fig. 3, negative horizontal drive pulses generated in synchronizing generator 13 are applied to the terminal 100 of the clamper circuit. The leading edge of each of these pulses initiates the horizontal return trace in the camera tube 11. At the left-hand edge of the picture being scanned is placed a reference black strip and clamping pulses must be made to occur each time this black strip is being scanned. The clamper circuit 16 shown in Fig. 3 develops a pulse delayed a controllable amount from the horizontal drive pulse and whose width is also controllable.

Figure 8:
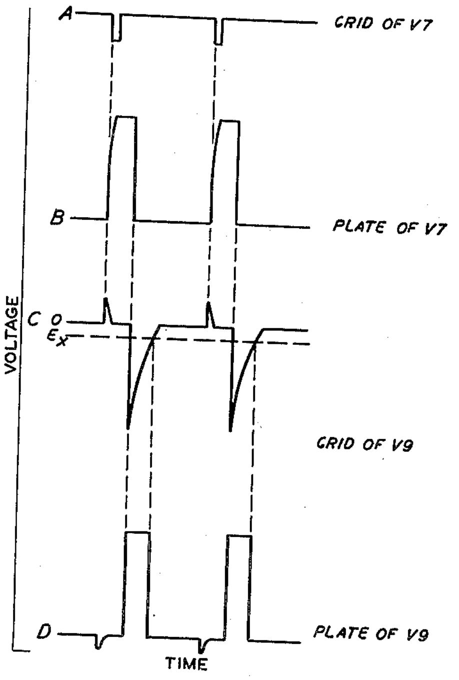
Fig. 8 shows in diagrammatic form the pulse shapes existing at different portions of the correcting circuit of this invention.

The pulse at the terminal 100 is applied by means of a coupling condenser 101 and "anti-sing" resistor 103 to the control grid of tube V7, the cathode of which is directly coupled to the cathode of the tube V8. These cathodes are also connected through resistor 104 to ground. The anode of the tube V7 is connected through resistor 105 to the positive terminal of the B-supply 130. The anode of the tube V7 is also connected through a coupling condenser 111 (variable) and "anti-sing" resistor 110 to the control grid of the tube V8 while the anode of the tube V8 is connected directly to the positive terminal of the B-supply 130. Bridged between the positive terminal of the B-supply and ground is a potentiometer comprising resistors 106, 107 and 108 in series. The common terminal of the resistors 106 and 107 is connected through resistor 102 to the common terminal of the resistance 103 and the coupling condenser 101 while the common terminal of the resistances 107 and 108 is connected through resistance 109 to the common terminal of the resistance 110 and condenser 111. Because of the biases applied by means of this potentiometer arrangement tube V7 is normally conducting and tube V8 is normally cut off. The horizontal drive pulse cuts off the tube V7 by regeneration in V7 and V8 and allows its plate to go positive up to the supply voltage. As the plate of the tube V7 goes positive, condenser 112 connected to the anode of the tube V7, and which is made variable to control the width, charges up to the supply voltage to resistor 105 and the grid-cathode current of tube V9. At the same time the condenser 111 (the delay control) charges through resistor 109. This charging time lasts a few microseconds as determined by the setting of the condenser 111. As condenser 111 charges, the voltage on the grid of V8 drops and since V8 acts as a cathode follower the voltage across resistor 104 eventually falls to a sufficiently low value that V7 becomes conducting again. The plate of the tube V7 is then suddenly dropped in potential and the tube V8 is completely cut off again. The pulse produced thereby is applied through the condenser 112 and resistor 114, cutting off the tube V9. However, the condenser 112 discharges through one path including the tube V7 and resistor 104 and through another path including resistor 113, and the negative voltage pulse on the grid of tube V9 exponentially decays at a rate determined by the setting of condenser 112. When the potential on the grid of V9 rises to a value only a few volts negative with respect to ground, the tube V9 then becomes conducting again. The plate of the tube V9 is driven positime when the negative pulse, from the tube V7, is applied across the resistor 113 and then falls when the tube V9 becomes conducting again. A positive pulse at the plate of V9 is thus obtained which is delayed from and different in width from the horizontal drive pulse. Fig. 8 shows the pulses which exist at the electrodes of the tubes V7, V8 and V9. Line A of Fig. 8 shows the variation of the grid voltage of tube V7 with respect to time, line B of Fig. 8 shows the variation of the plate voltage of the tube V7 with respect to time, line C shows the time variation of the grid voltage of the tube V9, while line D shows the variation of plate voltage of the tube V9, also with respect to time.

The pulse at the plate of tube V9 is applied to the grid of the tube V10 by a coupling condenser 119 and "anti-sing" resistor 121. Tube V10 is connected as a phase splitter and delivers a positive pulse from its cathode, connected through resistor 122 to ground, and a negative pulse from its plate, which is connected through resistor 118 to the positive terminal of B-supply 130. These two pulses are applied by means of the coupling condensers 123 and 125, respectively, to the anode of the diode V11 and to the cathode of the diode V12, respectively. The cathode of the tube V11 and the anode of the tube V12 are connected by the connection 86 which is in circuit with the control grid of the tube V3 in the arrangement of Fig. 2. The tubes V11 and V12, together with resistors 124 and 126, constitute a bridge circuit. During the pulse, if terminal 86 should be at a potential above or below ground, sufficient current flows through either V11 or V12, depending on the polarity of the potential difference, to bring terminal 86 to ground potential by adjusting the charge on condenser 63.

By proper control a wide variety of effective characteristics can be obtained in place of the 2.3 root characteristic shown in Fig. 7 and these characteristics if matched to the characteristics of the cathode-ray viewer tube at the receiver station will insure a linear system even though the characteristic of the viewing tube itself is not linear.

It is to be understood that the above-described arrangements are illustrative of the application of the principles of the invention but numerous other arrangements may be devised by those skilled in the art without departing from the spirit and scope of the invention. Moreover, it is to be understood that the specific numerical constants and values given in the specification are merely by way of example and may be varied in many cases considerably from the values given.

What is claimed is:

1. A correcting circuit for a television system comprising a source of television image signals, a first space current device having an anode, a cathode, a control grid, a screen grid, and a suppressor grid, a second space current device having an anode, a cathode, and a control grid, a third space current device having an anode, a cathode, and a control grid, means for applying said image signals to the control grid of the first device, a source of direct-current potential, means including a resistance for connecting the anode of said first device and the positive terminal of said direct-current source, means including resistance for connecting the cathode of the second device to the anode of the first device, means for connecting the anode of said second device to the positive terminal of said direct-current source, means including resistance for connecting the control grid of said second device to the screen grid of said first device, means including resistance and capacitance for connecting the screen grid of the first device to the negative terminal of the direct-current source, means including resistance for connecting the cathode of said third device to the screen grid of said first device, means including resistance for connecting the control grid of said third device to the cathode of said second device, means including resistance for connecting the anode of said third device to the positive terminal of the direct-current source, means including resistance for connecting the anode of said third device to the cathode of said third device, and means for utilizing the signal developed between the anode of said third device and the negative terminal of the direct-current source.

2. A correcting circuit for a television system in which image signals are applied to a television receiver tube which has a screen brightness versus signal voltage characteristic which obeys an $n$ power law where $n$ is greater than 1, comprising a source of television image signals, electronic circuit means for extracting the $n$th root of the signals applied thereto, said circuit means including a linear current generator having a non-linear impedance in its output circuit, amplifying means having an input and an output circuit and means for connecting the input circuit of said amplifying means in parallel with said impedance and means for applying said television signals to said electronic means.

3. A correcting circuit according to claim 2 in which said linear current generator has a variable non-linear impedance in its output circuit.

4. A correcting circuit according to claim 2 in which said linear current generator has an electronic variable non-linear impedance in its output circuit.

5. A correcting circuit for a television system in which image signals are applied to a television receiver tube which has a screen brightness versus signal voltage characteristic which obeys the $n$ power law where $n$ is greater than one, comprising a source of television image signals, said signals including a direct-current component, electronic circuit means for extracting the $n$th root of the signals applied thereto, said circuit means including a linear current generator having an input and an output circuit, means for applying said television signals to the input circuit of said current generator, a space current device having an input terminal, an output terminal and a control terminal, means connecting the input terminal of said space current device to the output circuit of said current generator, a first potential source, means for connecting the output terminal of said space current device to said first source, a second potential source, means for connecting the control terminal of said space current device to said second source, amplifying means having an input and an output circuit, and means for connecting the input circuit of said amplifying means in parallel with the input and output terminals of said space current device.

BERNARD M. OLIVER.

References Cited in the file of this patent

UNITED STATES PATENTS

| Number | Name | Date |
|---|---|---|
| 2,227,413 | Wolff et al. | Dec. 31, 1940 |
| 2,258,762 | Hickok | Oct. 14, 1941 |
| 2,378,797 | Schade | June 19, 1945 |
| 2,476,900 | Olson | July 19, 1949 |

FOREIGN PATENTS

| Number | Country | Date |
|---|---|---|
| 100,569 | Australia | Apr. 8, 1937 |
| 462,247 | Great Britain | Mar. 4, 1937 |